(12) United States Patent
Reynov et al.

(10) Patent No.: US 9,459,688 B2
(45) Date of Patent: Oct. 4, 2016

(54) METHODS AND APPARATUS FOR REDUCING ENERGY CONSUMPTION OF NETWORK EQUIPMENT

(71) Applicant: Juniper Networks, Inc., Sunnyvale, CA (US)

(72) Inventors: Boris Reynov, Cupertino, CA (US); Victor W. Mei, Palo Alto, CA (US); Venkata S. Raju Penmetsa, Sunnyvale, CA (US); Jack W. Kohn, Mountain View, CA (US); Ben T. Nitzan, El Granada, CA (US); Shreeram Siddhaye, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 346 days.

(21) Appl. No.: 13/852,189

(22) Filed: Mar. 28, 2013

(65) Prior Publication Data

US 2014/0298067 A1    Oct. 2, 2014

(51) Int. Cl.
*G06F 1/32* (2006.01)
*G06F 11/32* (2006.01)

(52) U.S. Cl.
CPC ............ *G06F 1/3287* (2013.01); *G06F 1/3231* (2013.01); *G06F 11/325* (2013.01); *Y02B 60/1289* (2013.01)

(58) Field of Classification Search
CPC .......................... G06F 1/3231; G06F 1/3287
See application file for complete search history.

(56) References Cited

U.S. PATENT DOCUMENTS

| | | | |
|---|---|---|---|
| 6,570,401 B2 * | 5/2003 | Correale et al. | 326/14 |
| 2010/0123578 A1 * | 5/2010 | Wray | 340/540 |
| 2010/0164736 A1 | 7/2010 | Byers et al. | |
| 2011/0296162 A1 | 12/2011 | Pakenham | |
| 2012/0013476 A1 | 1/2012 | Dove | |

OTHER PUBLICATIONS

Extended European Search Report issued to European Patent Application No. 13188901.6, on Sep. 4, 2015, 6 pgs.

* cited by examiner

*Primary Examiner* — Kim Huynh
*Assistant Examiner* — Siamak S Hefazi
(74) *Attorney, Agent, or Firm* — Cooley LLP (57) ABSTRACT

In some embodiments, an equipment unit has a set of visual indicators, a power switch, and a set of compute components. The power switch receives a signal representing a status such that when the status is in a first mode, the power switch provides power to the set of visual indicators and when the status is in a second mode the power switch does not provide power to the set of visual indicators. The compute components are configured to receive power when the power switch does not provide power to the set of visual indicators.

18 Claims, 5 Drawing Sheets

METHODS AND APPARATUS FOR REDUCING ENERGY CONSUMPTION OF NETWORK EQUIPMENT

BACKGROUND

Embodiments described herein relate to reducing energy consumption of network equipment, and more particularly, to apparatus and methods for selectively powering visual indicators included in the network equipment.

Some known communications networks have portions located within one or more data centers, which are centralized facilities (e.g., buildings) where data processing resources (e.g., routers, switches, servers, storage devices, and/or compute devices) are located. Some known data centers are configured to process, route and/or transmit electronic and/or optical signals to various nodes within the communications network. Some known data centers include large numbers (e.g., on the order of one hundred thousand) of data processing units (data processing resources).

Some known data processing units can include one or more light-emitting diodes (LEDs). The LEDs can produce different outputs associated with a status of the communications network, the operation of the data processing unit or the like. For example, some known data processing units include one or more LEDs that produce a flashing light to indicate the status of data transmission via the data processing units. Some known data processing units can include a display screen configured to output a fault code associated with a status of the operation of the data processing unit. Outputs produced by the LEDs and/or the display screen, however, can consume relatively large amounts of energy. For example, the LEDs included in the network equipment of a large data center can consume up to 1.2 kilowatt/hours per day or more. Moreover, large data centers are often not monitored by a person on a continuous basis. Thus, the visual indicators associated with the status of the network equipment are largely unnoticed.

Thus, a need exists for improved apparatus and methods for reducing energy consumption of network equipment.

SUMMARY

Apparatus and methods for reducing energy consumption of network equipment are described herein. In some embodiments, an equipment unit has a set of visual indicators, a power switch, and a set of compute components. The power switch receives a signal representing a status such that when the status is in a first mode, the power switch provides power to the set of visual indicators, and when the status is in a second mode, the power switch does not provide power to the set of visual indicators. The compute components are configured to receive power when the power switch does not provide power to the set of visual indicators.

DETAILED DESCRIPTION

Apparatus and methods for reducing energy consumption of equipment included in a network such as a data center network or the like are described herein. More specifically, the systems and methods described herein relate to selectively providing power to a set of visual indicators that would otherwise continuously remain in a powered state (e.g., turned on).

In some embodiments, an equipment unit has a set of visual indicators, a power switch, and a set of compute components. The power switch receives a signal representing a status such that when the status is in a first mode, the power switch provides power to the set of visual indicators, and when the status is in a second mode, the power switch does not provide power to the set of visual indicators. The compute components are configured to receive power when the power switch does not provide power to the set of visual indicators.

In some embodiments, a power controller is in communication with a set of equipment units. Each of the equipment units has a set of visual indicators, a power switch, and a set of compute components. The power controller sends a signal representing a status from a set of signals to each equipment unit. The power switch of each equipment unit provides power to the set of visual indicators for that equipment unit when the status for that equipment unit is in a first mode. When the status for that equipment unit is in a second mode, the power switch for that equipment unit does not provide power to the set of visual indicators for that equipment unit. The set of compute components for that equipment unit receive power independent of the status.

In some embodiments, a method includes receiving, at an equipment unit having a set of compute components and a set of visual indicators, a signal representing a status. When the status is in a first mode, power is provided to the set of visual indicators. When the status is in a second mode, power is withheld from the set of visual indicators. Power is provided to the set of compute components independent of the status.

As used herein the term "data processing unit" refers to any computer, electronic switch, switch fabric, portion of a switch fabric, router, host device, data storage device, line card or the like used to process, transmit and/or convey electrical and/or optical signals. A data processing unit can include, for example, a component included within an electronic communications network. In some embodiments, for example, a data processing unit can be a component included within or forming a portion of a core switch fabric of a data center. In other embodiments, a data processing unit can be an access switch located at an edge of a data center, or a host device (e.g., a server) coupled to the access device. For example, an access switch can be located on top of a chassis containing several host devices.

As used herein, the singular forms "a," "an" and "the" include plural referents unless the context clearly dictates otherwise. Thus, for example, the term "a data processing unit" is intended to mean a single data processing unit or multiple data processing units, "a visual indicator" is intended to mean one or more visual indicators, or a combination thereof.

Figure 1:
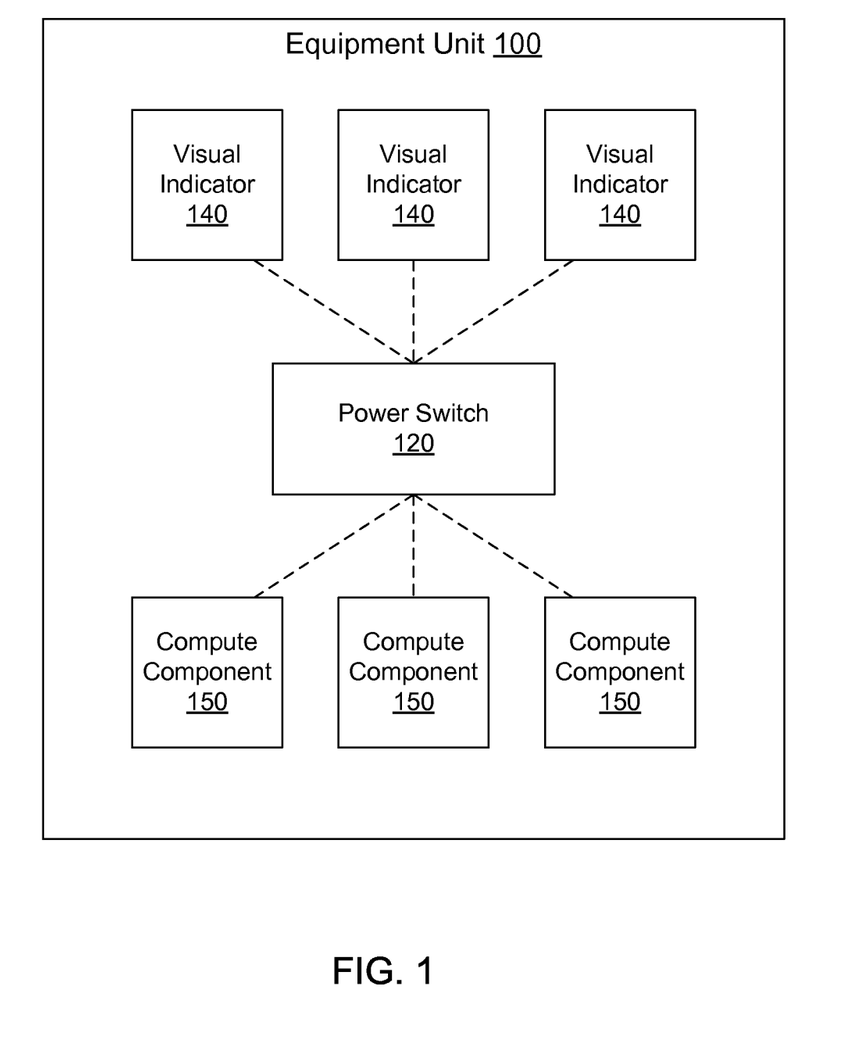
FIG. 1 is a schematic block diagram of an equipment unit according to an embodiment.

FIG. 1 is a schematic block diagram of an equipment unit 100 according to an embodiment. The equipment unit 100 can include a set of devices and/or data processing units that are interconnected to route data (e.g., a data unit, a data packet, a data frame, a string of bit values and/or a payload of data) between various devices (not shown in FIG. 1). For example, the equipment unit 100 can include any number and/or any combination of the data processing units described above. The equipment unit 100 can be included in, for example, a data center network or the like. In such embodiments, any suitable number of equipment units 100 and/or similar devices can be operably coupled via any suitable interface and/or switch fabric (not shown in FIG. 1). For example, the equipment unit 100 can be an edge data processing device that can function as an access or gateway device between the switch fabric and/or other devices (not shown). The switch fabric can be a cell-based fabric where one or more portions of data (e.g., data packets) are transmitted via the switch fabric in one or more cells (e.g., variable size cells, fixed size cells). In other words, the edge data processing device can provide a device, which can be configured to communicate via one protocol, with access to the switch fabric, which can be configured to communicate via another protocol. In some embodiments, the edge data processing device (i.e., the equipment unit 100) can be referred to and/or configured to function as an access switch, a router, a network hub device, a network bridge device, and/or the like.

In some embodiments, one or more portions of the equipment unit 100 can be a hardware-based module (e.g., an application-specific integrated circuit (ASIC), a digital signal processor (DSP), a field programmable gate array (FPGA)) and/or a software-based module (e.g., a module of computer code stored in memory and/or executed at a processor, a set of processor-readable instructions that can be stored in memory and/or executed at a processor). In some embodiments, one or more of the functions associated with the equipment unit 100 can be included in different modules and/or combined into one or more modules. In some embodiments, one or more of the functions associated with the equipment unit 100 can be included in different modules and/or combined into one or more modules.

In some embodiments, the equipment unit 100 can be included in and/or form one or more chassis or racks. For example, in some embodiments, the equipment unit 100 can be a top-of-rack (TOR) device associated with a chassis or rack that can include data processing units such as a blade server, line cards, and/or the like included in the chassis.

As shown in FIG. 1, the equipment unit 100 includes at least a power switch 120, a set of visual indicators 140, and a set of compute components 150. In some embodiments, the power switch 120 can be, for example, a hardware module included in an integrated circuit (IC) and/or a software module stored in a memory and executed by a processor (not shown in FIG. 1). The power switch 120 can be operably coupled to a network port and/or a controller of the equipment unit 100 (not shown in FIG. 1). For example, the network port can be a physical and/or logical interface between the equipment unit 100 and other components within a network such as a data center network. In this manner, data can be sent and/or received between the equipment unit 100 and the other components within the network. Although not shown in FIG. 1, the power switch 120 can include an input that can receive power from a power source (e.g., a power supply, a general power rail and/or the like) and can include an output that can provide power to, for example, the set of visual indicators 140. As described in further detail herein, the power switch 120 can receive a signal associated with a status and can selectively provide power to, for example, the visual indicators 140 based, at least partially, on the signal.

In some embodiments, the compute components 150 can be any data processing unit described above. In other embodiments, the compute components 150 can include, for example, at least a memory and a processor (not shown). Thus, the compute components 150 can be configured to perform one or more functions associated with, for example, routing, directing, classifying, and/or otherwise processing data (e.g., data units, data packets, data frames, a string of bit values, and/or a payload of data). The compute components 150 can be operably coupled to the power source (e.g., a power supply, a general power rail and/or the like), as described above with reference to the power switch 120. In other embodiments, the power switch 120 can include an output that can provide power to the compute components 150.

The visual indicators 140 can be any suitable device that is configured to output light, such as for example, a light emitting diode (LED), an incandescent light or a fluorescent light. In some embodiments, the visual indicators 140 can be disposed adjacent to, for example, a network port (not shown in FIG. 1) and can output a set of light outputs (or visual indications), each associated with a status of the network port. In some embodiments, the sever 100 can include multiple network ports each with one or more visual indicators 140 associated therewith. For example, in some embodiments, a network port can include a first visual indicator 140 associated with a link status and a second visual indicator 140 associated with an activity status. In this manner, an observer can ascertain information about the status of the network port by observing the output of the visual indicators 140. In some embodiments, for example, a characteristic of the first visual indicator 140 can be different than a characteristic of the second visual indicator 140. For example, in some embodiments, the first visual indicator 140 can have a first color associated with a first status (i.e., the link status) of the network port and the second visual indicator 140 can have a second color associated with a second status (i.e., the activity status) of the network port. Similarly, the first visual indicator 140 can have a different brightness and/or pattern (on/off duration, frequency of a flashing pattern or the like) than a brightness and/or pattern of the second visual indicator 140.

In some embodiments, each characteristic or combination of characteristics of the visual indication (or light) produced by the visual indicators 140 can be correlated to a particular status of the network port. Similarly stated, in some embodiments, each characteristic or combination of characteristics of the visual indicator output by the visual indicators 140 can be associated with a status of the network port via a one-to-one mapping. For example, in some embodiments, a GREEN light output can indicate that a network link via the network port has been established. A RED light output can indicate that a network link via the network port has not been established (or has failed). A bright RED light output can indicate that a network link via the network port has not been established for a period of time exceeding a predetermined time threshold. A flashing GREEN light output can indicate that data is being transmitted via the network port at a speed greater than a first speed threshold (e.g., 100 Mbps). A flashing BLUE light output can indicate that data is being transmitted via the network port at a speed greater than a second speed threshold (e.g., 1 Gbps). In other embodiments, each characteristic or combination of characteristics of the visual indications produced by the visual indicators 140 can be associated with a status of the network port via a one-to-many mapping. For example, in some embodiments, a brightness of the visual indication (or light) can indicate that a particular status of the network port has changed within a predetermined time period. The preceding are only examples of the mapping of the characteristics of the visual indications (or light) produced by the visual indicators 140 to the status of the network port, and are not intended to be limiting.

As described above, the equipment unit 100 can be included in a data center network. In some embodiments, a data center network can be relatively large and can include, for example, many equipment units 100 (e.g., tens, hundreds, or thousands). Such data centers are often unmanned (e.g., not continuously monitored by a person). Thus, the visual indications produced by the set of visual indicators 140 are largely unnoticed and can thereby needlessly consume a relatively large amount of energy. The power switch 120 can be configured to selectively provide power to the visual indicators 140.

For example, in some embodiments, the power switch 120 can be operably coupled to a detector (e.g., a human presence detector) such as, a motion sensor, a magnetic door sensor, a light sensor, a local toggle switch, and/or the like. In some embodiments, the detector can be included in or coupled to the equipment unit 100. In other embodiments, the detector can be in electrical communication with the equipment unit 100 over a network (e.g., via a wired or wireless communication) or individual communication connection. The detector can send a signal to the power switch 120 associated with a status in a first mode or a second mode. In some instances, the first mode of the status can be associated with a human presence within a range of the set of visual indicators 140. For example, in some embodiments, a motion sensor can detect a human presence and send a signal to the power switch 120 of the equipment unit 100. Upon receiving the signal associated with the status in the first mode, the power switch 120 can provide power to the visual indicators 140. Thus, the detected human(s) can ascertain information associated with, for example, an operating status of a network port, a line card, a blade server, and/or the equipment unit 100.

Conversely, the second mode of the status can be associated with a lack of human presence within the range of the set of visual indicators 140. For example, in some embodiments, the detector can send a signal to the power switch 120 after a predetermined time period of not detecting a human presence. Upon receiving the signal associated with the status in the second mode, the power switch 120 can provide power to (e.g., withhold power from) the set of visual indicators 140. Thus, with power withheld from the visual indicators 140, the visual indication provided by the visual indicators 140 is stopped. For example, by withholding power from an LED (e.g., a visual indicator 140), the LED is at least temporarily placed in an inoperable state (e.g., does not produce light and/or is in an "off" configuration). In some instances, once the power switch 120 receives a signal associated with the status in the second mode, the power switch 120 can withhold power from the visual indicators 140 until the power switch 120 receives a signal associated with the status in the first mode.

In some embodiments, the power switch 120 can provide power to the compute components 150 independent of the status. For example, in some embodiments, as long as the power switch 120 receives power from the input (described above), the power switch 120 can continuously provide power to the compute components 150. In other embodiments, the power switch 120 can provide power to the compute components 150 when the status is in the second mode (e.g., independent of the status). For example, the compute components 150 can receive power from the power switch 120 when the power switch 120 does not provide power to the set of visual indicators 140. In still other embodiments, the compute components 150 can receive power from a power source other than the power switch 120 (e.g., independent of the power switch 120).

Figure 2:
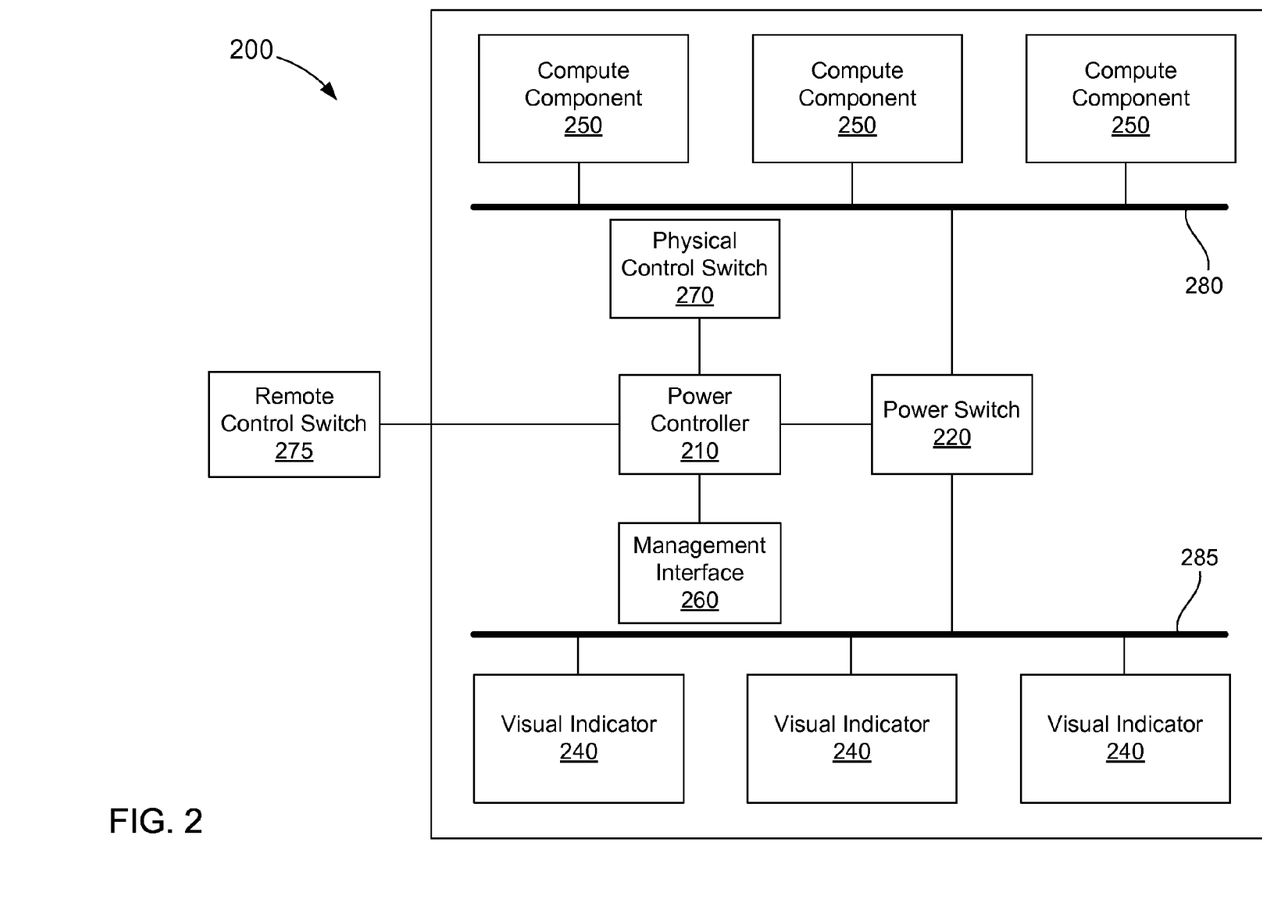
FIG. 2 is schematic block diagram of an equipment unit according to an embodiment.

FIG. 2 is a schematic illustration of an equipment unit 200 according to an embodiment. The equipment unit 200 can include a power controller 210, a power switch 220, a set of visual indicators 240, a set of compute components 250, a general power rail 280, and an indicator power rail 285. The equipment unit 200 can be any suitable device such as, for example, those described above. As shown, the power switch 220 is operably coupled to the power controller 210, the general power rail 280, and the indicator power rail 285. The power switch 220 can be, for example, a hardware module included in an IC or a software module included in a memory and executed at a processor (not shown in FIG. 2). In this manner, the power switch 220 can receive a signal from the power controller 210 that is associated with a status and based on the signal, selectively power the set of visual indicators 240, as described in further detail herein.

The compute components 250 included in the equipment unit 200 can be any data processing unit described above. In some embodiments, the compute components 250 can include, for example, at least a memory and a processor (not shown). Thus, the compute components 250 can be configured to perform one or more functions associated with, for example, routing, directing, classifying, and/or otherwise processing data (e.g., data packets, a string of bit values, and/or a payload of data). As shown in FIG. 2, the compute components 250 can be operably coupled to the general power rail 280. In this manner, the compute components 250 can receive power from the general power rail 280 independently from the visual indicators 240 and/or the power switch 220. In other embodiments, the power switch can send a signal to the compute components that is operable in providing power to thereto. For example, in some embodiments, the compute components can receive a first voltage from the general power rail and a second voltage (e.g., a low voltage) from the power switch. Thus, the second voltage provided by the power switch can be operable in powering the compute components.

The visual indicators 240 included in the equipment unit 200 can be any suitable device that is configured to output light, such as for example, a light emitting diode (LED), an incandescent light or a fluorescent light. In some embodiments, the visual indicators 240 can be disposed adjacent to, for example, a network port (not shown in FIG. 2) and can output a set of light outputs (or visual indications), each associated with a status of the network port. In some embodiments, the sever 200 can include multiple network ports each with one or more visual indicators 240 associated therewith. For example, in some embodiments, a network port can include a first visual indicator 240 associated with a link status and a second visual indicator 240 associated with an activity status. Thus, an observer can ascertain information about the status of the network port by observing the output of the visual indicators 240. In this manner, the visual indicators 240 can be similar in form and function as the visual indicators 140 described above with reference to FIG. 1.

As described above, the power controller 210 is operably coupled to the power switch 220. In some embodiments, the power controller 210 can be included in the equipment unit

200. For example, the power controller 210 can be a hardware module included in the IC and/or a software module included in the memory and executed at the processor. In other embodiments, the power controller can be external from and operably coupled to the equipment unit. The power controller 210 can be an independent electronic device that can include at least a processor, a memory, and a communication device. In such embodiments, the power controller 210 can receive a signal via the communication device and upon receiving the signal, can send, to the power switch 220 and via the communication device, a signal associated with a status in a first mode or a second mode.

As shown in FIG. 2, the power controller 210 can be external from and operably coupled to a remote control switch 275, a physical control switch 270, and a management interface 260. The remote control switch 275 can be, for example, a human presence detection device such as, for example, a motion sensor, a magnetic door sensor, a light sensor, and/or the like. The remote control switch 275 can be configured to send a signal to the power controller 210 associated with the status in the first mode or the second mode. For example, in some embodiments, the first mode of the status can be associated with a human presence within a range of the visual indicators 240. Upon receiving the signal from the remote control switch 275, the power controller 210 can send a signal to the power switch 220 associated with the status in the first mode and, in turn, the power switch 220 can provide power to the indicator power rail 285 such that the visual indicators 240 receive a voltage. Conversely, the second mode of the status can be associated with a lack of human presence within the range of the visual indicators 240. Upon receiving the signal from the remote control switch 275, the power controller 210 can send a signal to the power switch 220 associated with the status in the second mode and, in turn, the power switch 220 can withhold power from or switch off the indicator power rail 285. Thus, by withholding the power from the indicator power rail 285, the visual indicators 240 can be at least temporarily placed in an inoperable state (e.g., turned off). Moreover, by selectively providing power to the visual indicators 240, the energy consumption of the equipment unit 300 can be reduced.

As shown in FIG. 2, the equipment unit 200 can include a physical control switch 270 that can send a signal associated with the status in the first mode or the second mode to the power controller 210. For example, in some embodiments, the physical control switch 270 can be a physical toggle, a push button, a slider, a rotatable knob and/or the like that is external from and operably coupled to the power controller 210. The physical control switch 270 can be moved (e.g., by a human) between a first position associated with a human presence and a second position associated with a lack of human presence. In this manner, the physical control switch 270 can send a signal to the power controller 210 associated with the status in the first mode or the second mode based on the relative position of the physical control switch 270. Upon receiving the signal, the power controller 210 can send a signal to the power switch 220 associated with the status in the first mode or the second mode. The power switch 220 can, in turn, provide power to or withhold power from the indicator power rail 285 based on the signal from the power controller 210 associated with the status in the first mode or the second mode, respectively. Although the physical control switch 270 is described above as being external from and operably coupled to the power controller 210, in other embodiments, the power controller can include the physical control switch.

In some embodiments, the equipment unit 200 can include a management interface 260 that is operably coupled to the power controller 210. For example, in some embodiments, the management interface can be a port that can be operably coupled to a management interface device (not shown). In some embodiments, a user (e.g., a human) can couple a management interface device (e.g., a personal computer (PC), a laptop, a mobile device, a smart phone and/or any other suitable diagnostic device) to the management interface 260 and can manipulate the management interface device to, for example, send a signal to the power controller 210 associated with the status in the first mode or the second mode. Upon receiving the signal, the power controller 210 can send a signal to the power switch 220 associated with the status in the first mode or the second mode and, in turn, the power switch 220 can provide power to or withhold power from (respectively) the indicator power rail 285 based on the signal from the power controller 210. In some embodiments, the user can manipulate the management interface device to change the characteristics of the visual indicators 240 and/or the function of the power switch 220. For example, in some embodiments, the user can change a predetermined time period after which a detector (e.g., a human presence detection device operably coupled to the remote control switch) sends the signal associated with the status in the second mode (as described above with reference to FIG. 1). In other embodiments, the user can manipulate the management interface device to select a subset of visual indicators 240 that receive power from the power switch 220 regardless of the status. While described above as being a port, in other embodiments, the management interface 260 can be, for example, a user interface included in the equipment unit 200 and having a display and a user input portion (e.g., a keyboard, a touch screen, a mouse, and/or the like).

Figure 3:
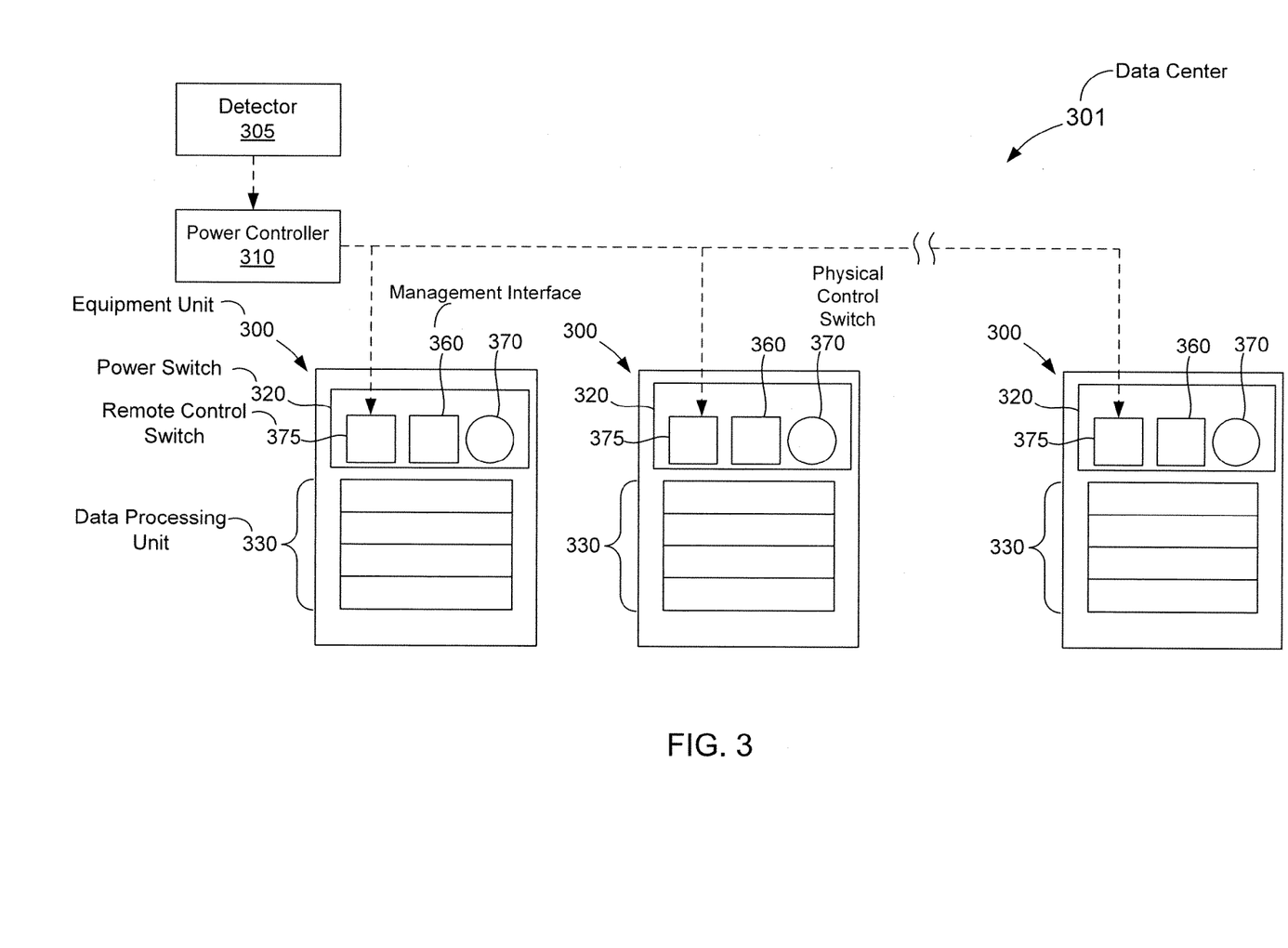
FIG. 3 is schematic illustration of an energy management system according to an embodiment.

While the power controller 210 is shown in FIG. 2 as being included in the equipment unit 200, in other embodiments, a power controller can be operably coupled to a set of equipment units included in a data center network or the like. For example, FIG. 3 is a schematic illustration of a data center network 301 (also referred to herein as "data center") according to an embodiment. The data center 301 can include a detector 305, a power controller 310, and a set of equipment units 300. While the data center 301 is shown in FIG. 3 as including three equipment units 300, the data center 301 can include any number of equipment units 300 (e.g., tens, hundreds, or thousands).

The power controller 310 can be operably coupled to the detector 305 and operably coupled to a remote control switch portion 375 of each equipment unit 300 included in the data center 301. The detector 305 can be any suitable human presence detector such as, for example, those described above with reference to FIG. 2. In this manner, the detector 305 can be configured to detect a status of a human presence within a range of at least a portion of the equipment units 300 included in the data center 301 and, in turn, send a signal associated with the status in a first mode or a second mode. For example, as described above with reference to FIG. 1, when the detector 305 detects a human presence within the range of at least a portion of the equipment units 300 included in the data center 301, the detector 305 can send a signal to the power controller 310 associated the status in the first mode. Conversely, the second mode of the status can be associated with a lack of human presence within the range of the portion of the equipment units 300 included in the data center 301.

The power controller 310 can be any suitable device configured to receive a signal from the detector 305 and, in turn, send a signal to the remote control switch portion 375 of at least a portion of the equipment units 300 included in the data center 301. For example, in some embodiments, the power controller 310 can be an electronic management device that can include at least a processor and a memory (not shown in FIG. 3). In this manner, the power controller 310 can be configured to send a signal to at least a portion of the equipment units 300 included in the data center 301. More specifically, the memory of the power controller 310 can include a set of instructions or code executed by the processor that is associated with receiving the signal from the detector 305 and, in turn, sending a signal associated with the status to at least a portion of the equipment units 300 included in the data center 301. The power controller 310 can send a signal associated with the status such that some equipment units 300 in the data center 301 are associated with the status in the first mode and other equipment units 300 in the data center 301 are associated with the status in the second mode.

Figure 4:
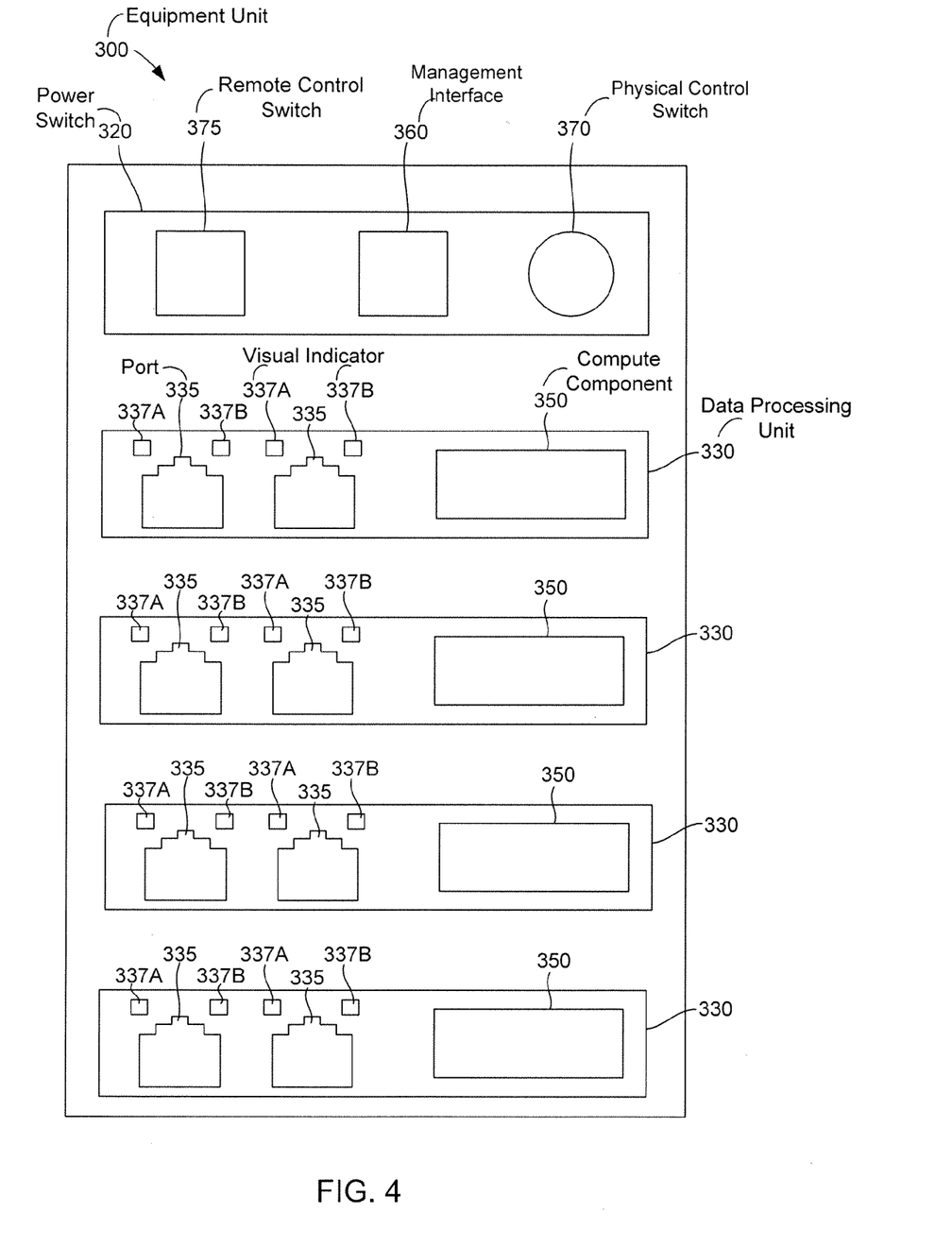
FIG. 4 is a schematic illustration of an equipment unit included in the energy management system of FIG. 3.

The equipment units 300 can be any suitable network equipment such as, for example, those described above with reference to FIG. 1. In some embodiments, the equipment units 300 can be operably coupled via a switch fabric (not shown in FIG. 3) and/or the like. Each equipment unit 300 is substantially similar with respect to a set of visual indicators (described below), thus, a discussion of an equipment unit 300 applies to all equipment units 300 included in the data center 301. As shown in FIGS. 3 and 4, each equipment unit 300 includes a power switch 320, a remote control switch portion 375, a physical control switch portion 370, a management interface portion 360, and a set of data processing units 330. In some embodiments, the remote control switch portion 375, the physical control switch portion 370, and the management interface portion 360 can be included in the power switch 320. For example, in some embodiments, the power switch 320 can be a hardware module (e.g., included in an IC, ASIC, or the like) and/or a software module (e.g., stored in a memory and/or executed at a processor) that can include the remote control switch portion 375, the physical control switch portion 370, and the management interface portion 360. In other embodiments, the remote control switch portion 375, the physical control switch portion 370, and the management interface portion 360 can be external from and operably coupled to the power switch 320.

As shown in FIG. 4, the data processing units 330 included in the equipment units 300 can include, for example, at least a compute component 350, and a set of ports 335. The compute component 350 included in the data processing units 330 can be any data processing unit described above. In some embodiments, the compute components 350 can be configured to perform one or more functions associated with, for example, routing, directing, classifying, and/or otherwise processing data (e.g., data packets, a string of bit values, and/or a payload of data). Each port 335 can be associated with a first visual indicator 337A and a second visual indicator 337B. The first visual indicator 337A and the second visual indicator 337B can be, for example, LEDs or the like. The ports 335, the first visual indicators 337A, the second visual indicators 337B, and the compute components 350 can each be operably coupled to the power switch 320. For example, the power switch 320 can provide power to the ports 335 and the compute component 350 and can selectively provide power to the visual indicators 337A and 337B based at least in part on the status (described above). More specifically, the power switch 320 can be operably coupled to an indicator power rail (e.g., the indicator power rail 285 described above with reference to FIG. 2) that can selectively provide power to each visual indicator 337A and 337B included in the equipment unit 300 based on the mode of the status. In some embodiments, the compute components 350 and the ports 335 can be coupled to a general power rail (e.g., the general power rail 280 described above with reference to FIG. 2) independent of the power switch 320.

The first visual indicator 337A can be associated with a link status of the corresponding port 335; the second visual indicator 337B can be associated with an activity status of the corresponding port 335. The first visual indicator 337A and the second visual indicator 337B can be substantially similar in form and function as the visual indicators 140 described above with reference to FIG. 1. Thus, aspects of the visual indicators 337A and 337B are not described in further detail herein. The first visual indicator 337A and the second visual indicator 337B can display, for example, a light associated with the status of the port 335 and/or the data processing unit 330 (e.g., the visual indicators 337A and 337B are LEDs or the like). The visual indicators 337A and 337B are operably coupled to the power switch 320 such that the power switch 320 selectively provides power to the visual indicators 337A and 337B based at least in part on the mode (e.g., the first mode or the second mode) of the status, as described in further detail herein.

As described above, the power controller 310 is operably coupled to remote control switch portion 375 of each equipment unit 300 (e.g., in electrical communication with each equipment unit 300 via a wired or wireless connection). The remote control switch portion 375 can be, for example, a port and/or suitable communication device (e.g., transceiver) and can receive the signal associated with the status from the power controller 310. In use, the detector 305 can detect a human presence within the range of the portion of the equipment units 300 included in the data center 301 and can send a signal to the power controller 310 associated with the status in the first mode. Upon receiving the signal from the detector 305, the power controller 310 can send a signal to at least a portion of the equipment units 300 included in the data center 301. For example, in some embodiments, the data center 301 can include a first subset of equipment units 300 and a second subset of equipment units 300. In such embodiments, the first subset of equipment units 300 and the second subset of equipment units 300 can be associated with different spatial locations (e.g., zones) in the data center 301 (e.g., in cases where the data center 301 includes a large number of equipment units 300). In this manner, the power controller 310 can send the signal associated with the status in the first mode to the first subset of equipment units 300 when the detector 305 detects a human presence within the range of the first subset of equipment units 300. In some instances, the power controller 310 can send the signal to the first subset of equipment units 300 while not sending the signal to the second subset of equipment units 300. In such instances, the first subset of equipment units 300 (e.g., a first zone) can be associated with the status in the first mode and the second subset of equipment units 300 (e.g., a second zone) can be associated with the status in the second mode. In some embodiments, the equipment units included in a data center can separated into any number of subsets or zones (e.g., more than two subsets) that can each be associated with a detector. In this manner, a subset of equipment units can be associated with the status in the first mode or the second mode based on a signal sent from the corresponding detector associated with that subset of equipment units. In other instances, the power controller can send the signal to all the equipment units included in the data center regardless of subsets or zones.

The remote control switch portion 375 can receive the signal from the power controller 310 such that the power switch 320 can, in turn, provide power to the visual indicators 337A and 337B of each data processing unit 330 included in the equipment unit 300 (e.g., via an indicator power rail or the like). For example, in some embodiments, the remote control switch portion 375 can be included in the power switch 320 (e.g., as a hardware module and/or a software module) such that the power switch 320 receives the signal associated with the status in the first mode from the power controller 310 via the remote control switch 375. In other embodiments, the remote control switch can be external from and operably coupled to the power switch and can send a signal associated with the status in the first mode to the power switch. In this manner, power is supplied to the first visual indicator 337A and the second visual indicator 337B of each port 335 included in each data processing unit 330 when the detector 305 detects a human presence. Thus, the detected human(s) can ascertain the status of the ports 335, data processing units, 330, and/or the equipment unit 300 by viewing the visual indicators 337A and 337B.

Conversely, after a predetermined time period of not detecting a human presence, the detector 305 can send a signal to the power controller 310 associated with the status in the second mode (e.g., the lack of a human presence in range of the portion of the equipment units 300). Upon receiving the signal from the detector 305, the power controller 310 can send a signal to the remote control switch portion 375 of each equipment unit 300 associated with the status in the second mode. The power switch 320 can receive the signal associated with the status in the second mode and can, in turn, withhold power from the visual indicators 337A and 337B of each port 335 included in each data processing unit 330 of each equipment unit 300. Thus, by withholding the power from the visual indicators 337A and 337B (e.g., withholding power from an indicator power rail not shown in FIGS. 3 and 4), the visual indicators 337A and 337B associated with each port 335 included in each data processing unit 330 can be at least temporarily placed in an inoperable state (e.g., turned off). Thus, the energy consumption of the of the data center 301 can be reduced.

The power switch 320 can include the physical control switch portion 370. In other embodiments, the physical control switch can be external from and operably coupled to the power switch. The physical switch portion 370 can include a physical toggle switch (e.g., a local switch not shown in FIGS. 3 and 4) that can send a signal associated with the status in the first mode or the second mode to the power controller 310. For example, in some embodiments, the physical switch portion 370 can include or be operably coupled to a physical toggle, push button, slider, rotatable knob and/or the like that is operably coupled to the power controller 310. Thus, the physical toggle switch can be moved (e.g., by a human) between a first position associated with, for example, a human presence, and a second position associated with, for example, a lack of human presence. In this manner, the physical switch portion 370 can send a signal to the power switch 320 associated with the status in the first mode or the second mode based on the relative position of the physical toggle switch. Upon receiving the signal, the power switch 320 can provide power to or withhold power from the indicator power rail 385 based on the signal from the physical switch portion 370 associated with the status in the first mode or the second mode, respectively, as described above.

The power switch 320 of each equipment unit 300 can be configured to include or can be operably coupled to the management interface portion 360. For example, in some embodiments, the management interface portion 360 can be a port that can be operably coupled to a management interface device, as described above with reference to FIG. 2. In this manner, a user (e.g., a human) can couple a management interface device (e.g., a personal computer (PC), a laptop, a mobile device, a smart phone and/or any other suitable diagnostic device) to the management interface portion 360 to send a signal to the power switch 320 (e.g., via the management interface portion 360) associated with the status in the first mode or the second mode. Upon receiving the signal, the power switch 320 can provide power to or withhold power from (respectively) the visual indicators 337A and 337B based on the signal from the management interface device. In some embodiments, the user can manipulate the management interface device to change the characteristics of the visual indicators 3337A and/or 337B and/or the equipment unit 300, as described above with reference to FIG. 2.

While not shown in FIG. 3, in some embodiments, the power controller 310 can include a management interface portion similar to the management interface portion 360 of the equipment units 300. In this manner, a user can place a management interface device in electrical communication with the power controller 310 to change, for example, one or more system parameters. For example, the user can define the first subset of equipment units 300 and the second subset of equipment units 300 (described above). In some embodiments, the power controller 310 and/or the remote control switch portion 375 of the equipment units 300 can be operably coupled to a remote control system. For example, in some embodiments, the power controller 310 and/or the remote control switch portion 375 of each equipment unit 300 can be in electrical communication with a management interface device (e.g., a PC or the like) included in a control room or the like.

Figure 5:
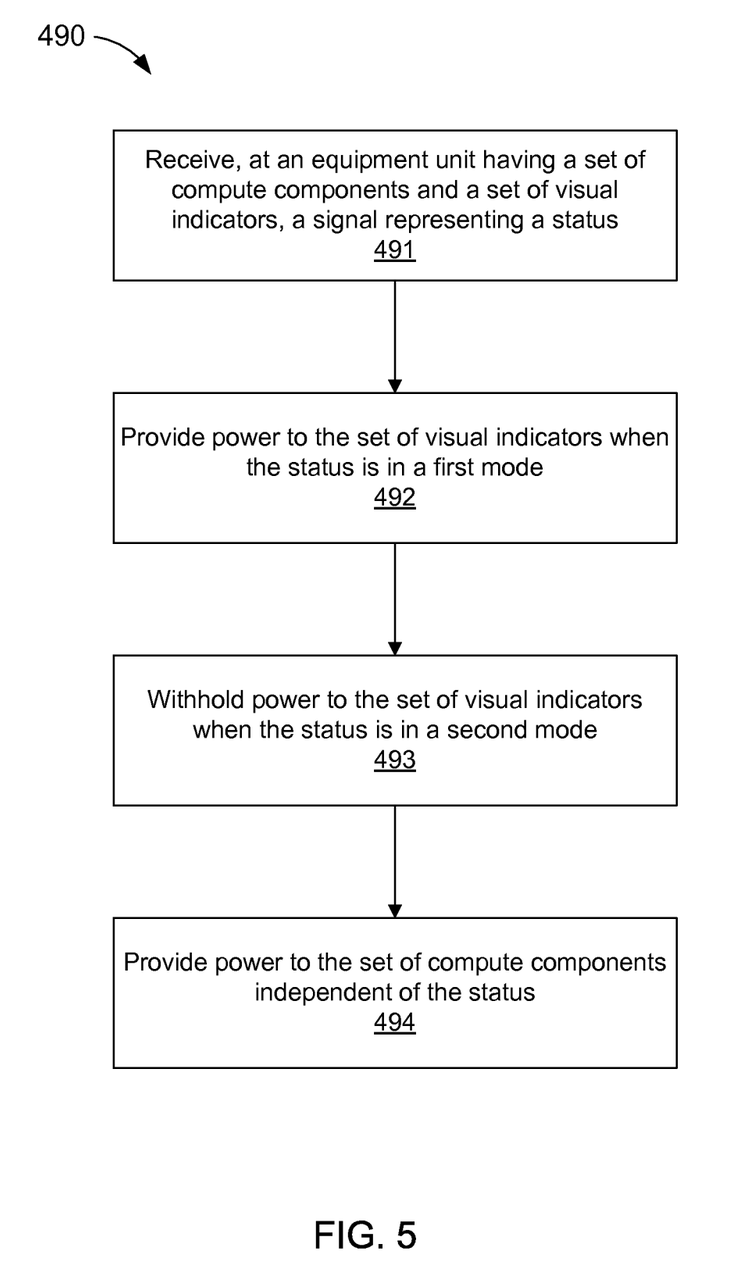
FIG. 5 is a flow chart of a method of reducing energy consumption of network equipment according to an embodiment.

FIG. 5 is a flow chart of a method 490 of reducing energy consumption of network equipment according to an embodiment. The method 490 includes receiving, at an equipment unit having a set of compute components and a set of visual indicators, a signal representing a status, at 491. The equipment unit can be any of those described above such as, for example, the equipment unit 300 described with reference to FIGS. 3 and 4. In this manner, the equipment unit can be included in a data center network or the like. Moreover, the equipment unit can include a set of visual indicators associated with, for example, a port or the like included in a data processing unit (e.g., a line card or the like).

The equipment unit can be operably coupled to a human presence detector such as, for example, a motion sensor, a magnetic door lock, a light sensor, a local switch, and/or the like. In some embodiments, a power controller can be operably coupled to the human presence detector and operably coupled to each equipment unit included in a data center network (as described above with reference to FIG. 3). Thus, the detector can be configured to detect a human presence and can send a signal to the equipment unit associated with the status of human detection. In some embodiments, the equipment unit can include a power switch or the like that can receive a signal associated with the status. As described above, the status can be in a first mode when a human presence is within a range of the visual indicators of the equipment unit and can be in a second mode when a lack of human presence is within a range of the visual indicators of the equipment unit. In this manner, power can be provided to the visual indicators when the status is in the first mode, at 492.

In some embodiments, the detector can be configured to send a signal associated with the status in a second mode after a period of time of not detecting a human presence. Thus, at 493, power can be withheld from the visual indicators when the status is in the second mode. More specifically, as described above, the power switch can be configured to withhold power from the visual indicators and/or an indicator power rail when the power switch receives a signal associated with the status in the second mode.

As described above with reference to FIG. 2, the compute components of the equipment unit can be operably coupled to a general power rail (e.g., similar to the general power rail 280). In this manner, the compute components can receive power from the general power rail independently from power provided by the power switch. Thus, power can be provided to the compute components independent of the status, at 494.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. For example, although the embodiments described herein include visual indicators, in other embodiments, an equipment unit can include audible indicators, that can selectively receive power from a power switch by using the methods described herein.

Although various embodiments have been described as having particular features and/or combinations of components, other embodiments are possible having a combination of any features and/or components from any of embodiments as discussed above.

What is claimed is:

1. An apparatus, comprising:
an equipment unit having a plurality of visual indicators, a power switch, a plurality of compute components, a general power rail, and a visual indicator power rail, the power switch including a management interface port and configured to be operatively coupled to a power controller,
the management interface port configured to receive a first signal representing an instruction from a remote processor separate from the equipment unit, the management interface port configured to send a second signal to the power switch,
the power switch configured to receive the first signal and the second signal that represents a status from the power controller, the power switch configured to provide power to the plurality of visual indicators when the status is in a first mode or when the instruction is a first instruction, the power switch configured to not provide power to the plurality of visual indicators when the status is in a second mode or when the instruction is a second instruction different from the first instruction,
the first instruction associated with the status being in the first mode when a human presence is within a range associated with the plurality of visual indicators,
the second instruction associated with the status being in the second mode when a human presence is not within the range associated with the plurality of visual indicators,
the plurality of compute components configured to receive power when the power switch does not provide power to the plurality of visual indicators,
the power switch having an input operatively coupled to the general power rail and an output operatively coupled to the visual indicator power rail, the plurality of compute components operatively coupled to the general power rail, the plurality of visual indictors operatively coupled to the visual indicator power rail.

2. The apparatus of claim 1, wherein:
the status is the first mode when the human presence is within the range associated with the plurality of visual indicators,
the status is the second mode when the human presence is not within the range associated with the plurality of visual indicators.

3. The apparatus of claim 1, further comprising:
a plurality of data processing units, each data processing unit from the plurality of data processing units including at least two visual indicators from the plurality of visual indicators and including at least one compute component from the plurality of compute components.

4. The apparatus of claim 1, further comprising:
a plurality of data processing units, each data processing unit from the plurality of data processing units including at least one compute component from the plurality of compute components, each data processing unit from the plurality of data processing units including a plurality of ports,
each port from the plurality of ports for each data processing unit from the plurality of data processing units including a first visual indicator associated with a link status for that port and a second visual indicator from the plurality of visual indicators associated with an activity status for that port.

5. The apparatus of claim 1, wherein:
the power controller configured to send the second signal representing the status to the power switch based on a signal from the detector.

6. The apparatus of claim 1, wherein:
the power controller configured to send the second signal representing the status to the power switch based on a signal from the detector,
the status is the first mode when the human presence is detected by the detector within the range associated with the plurality of visual indicators,
the status is the second mode when the human presence is not detected by the detector within the range associated with the plurality of visual indicators.

7. The apparatus of claim 1, wherein;
the equipment unit is a first equipment unit, the power switch is a first power switch,
the power controller configured to be operatively coupled to a detector and a plurality of power switches including the first power switch, each power switch from the plurality of power switches being included in an equipment unit from a plurality of equipment units that includes the first equipment unit,
the power controller configured to send, based on a signal from the detector, the second signal representing the status to each power switch from the plurality of power switches.

8. The apparatus of claim 1, wherein:
the equipment unit is a first equipment unit, the power switch is a first power switch,
the power controller configured to be operatively coupled to a detector and a plurality of power switches including the first power switch, each power switch from the plurality of power switches being included in an equipment unit from a plurality of equipment units that includes the first equipment unit,
the power controller configured to send the second signal representing the status in the first mode to a first subset of power switches from the plurality of power switches, the status in the first mode being associated with the human presence within the range associated with the plurality of visual indicators for each power switch from the first subset of power switches,
the power controller configured to send the second signal representing the status in the second mode to a second subset of power switches from the plurality of power switches mutually exclusive from the first subset of power switches, the status in the second mode being associated with the human presence not within the range associated with the plurality of visual indicators for each power switch from the second subset of power switches.

9. The apparatus of claim 1, wherein the power switch is a first power switch, the apparatus further comprising:
a second power switch operatively coupled to the equipment unit,
the second power switch configured to provide power to the plurality of visual indicators when the status is in the first mode, the second power switch configured to not provide power to the plurality of visual indicators when the status is in the second mode, the plurality of compute components configured to receive power when the second power switch does not provide power to the plurality of visual indicators.

10. The apparatus of claim 1, wherein:
the equipment unit includes a physical control switch operatively coupled to the power switch, the physical control switch configured to send the second signal representing the status based on a position of the physical control switch.

11. A method, comprising:
receiving, at a management interface port of an equipment unit, a first signal representing an instruction from a remote processor separate from the equipment unit, the equipment unit having a power switch, a plurality of compute components, and a plurality of visual indicators, the power switch including the management interface port;
receiving, at the power switch from a power controller, a second signal representing a status, the power controller operatively coupled to the power switch;
providing power to the plurality of visual indicators from a visual indicator power rail and not from a general power rail when the status is in a first mode or when the instruction is a first instruction, the first instruction associated with the status being in the first mode when a human presence is within a range associated with the plurality of visual indicators;
withholding power to the plurality of visual indicators when the status is a second mode or when the instruction is a second instruction different from the first instruction, the second instruction associated with the status being in the second mode when a human presence is not within the range associated with the plurality of visual indicators; and
providing power, from the general power rail and not from the visual indicator rail, to the plurality of compute components independent of the status.

12. The method of claim 11, wherein:
the first mode is associated with the human presence within the range associated with the plurality of visual indicators; and
the second mode is associated with the human presence not within the range associated with the plurality of visual indicators.

13. The method of claim 11, wherein:
the equipment unit includes a plurality of data processing units, each data processing unit from the plurality of data processing units including at least two visual indicators from the plurality of visual indicators and including at least one compute component from the plurality of compute components.

14. The method of claim 11, wherein:
the equipment unit includes a plurality of data processing units, each data processing unit from the plurality of data processing units including at least one compute component from the plurality of compute components, each data processing unit from the plurality of data processing units including a plurality of ports,
each port from the plurality of ports for each data processing unit from the plurality of data processing units including a first visual indicator associated with a link status for that port and a second visual indicator from the plurality of visual indicators associated with an activity status for that port.

15. The method of claim 11, wherein:
the second signal representing the status is received from the power controller operatively coupled to a detector based on a signal from the detector.

16. An apparatus, comprising;
a power controller configured to be in communication with a plurality of equipment units, each equipment unit from the plurality of equipment units having a plurality of visual indicators, a power switch including a management interface port, and a plurality of compute components, the management interface port of each equipment unit from the plurality of equipment units configured to receive a first signal representing an instruction from a plurality of first signals from a remote processor separate from the plurality of equipment units, the power controller configured to send a second signal representing a status from a plurality of second signals to each equipment unit from the plurality of equipment units such that (1) the power switch for each equipment unit from the plurality of equipment units provides power from a visual indicator power rail and not from a general power rail to the plurality of visual indicators for that equipment unit when the status for that equipment unit is in a first mode or when the instruction is a first instruction, the first instruction associated with the status being in the first mode when a human presence is within a range associated with the plurality of visual indicators, (2) the power switch for that equipment unit does not provide power from the visual indicator power rail to the plurality of visual indicators for that equipment unit when the status for that equipment unit is in a second mode or when the instruction is a second instruction different from the first instruction, the second instruction associated with the status being in the second mode when a human presence is not within the range associated with the plurality of visual indicators, and (3) the plurality of compute components for that equipment unit receives power from the general power rail and not from the visual indicator power rail independent of the status.

17. The apparatus of claim 16, wherein:

the power controller is configured receive from a detector a signal indicating (1) a first subset of equipment units from the plurality of equipment units having the human presence within the range associated with the plurality of visual indicators for each equipment unit from the first subset of equipment units, and (2) a second subset of equipment units from the plurality of equipment units mutually exclusive from the first subset of equipment units having the human presence not within the range associated with the plurality of visual indicators for each equipment unit from the second subset of equipment units, the status in the first mode is associated with the first subset of equipment units, the status in the second mode is associated with the second subset of equipment units.

18. The apparatus of claim 16, wherein:

the power controller is configured to be in communication with a detector, the power controller configured to send the second signal representing the status in the first mode from the plurality of second signals to a first subset of equipment units from the plurality of equipment units when the detector detects the human presence within the range associated with the plurality of visual indicators for each equipment unit from the first subset of equipment units, the power controller configured to send the second signal representing the status in the second mode to a second subset of equipment units from the plurality of equipment units mutually exclusive from the first subset of equipment units when the detector detects the human presence not within the range associated with the plurality of visual indicators for each equipment unit from the second subset of equipment units.

* * * * *